United States Patent Office 3,144,404
Patented Aug. 11, 1964

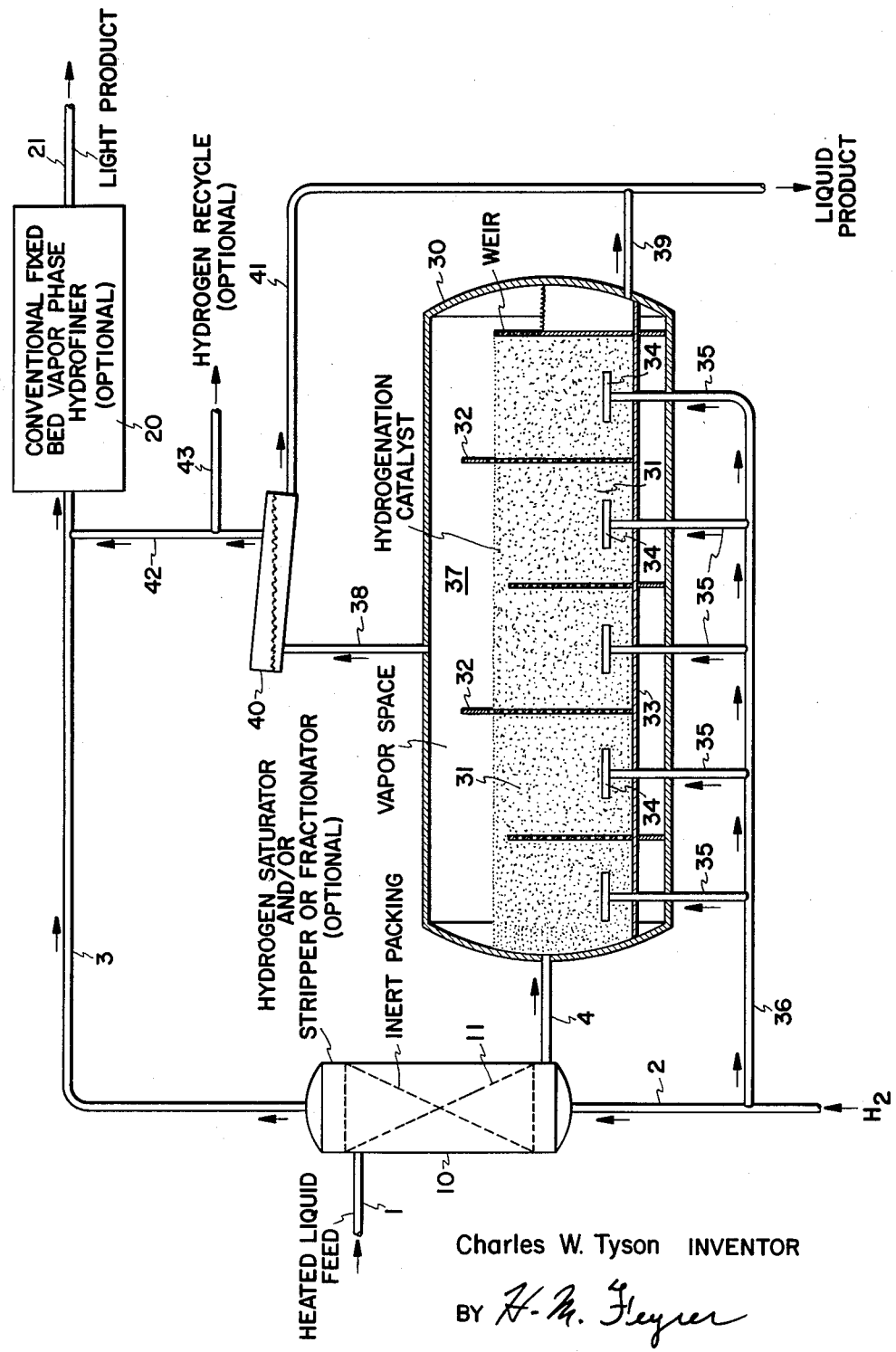

3,144,404
HYDROTREATING PROCESS AND APPARATUS
Charles W. Tyson, Summit, N.J., assignor to Esso Research and Engineering Company, a corporation of Delaware
Filed Jan. 3, 1961, Ser. No. 80,181
5 Claims. (Cl. 208—264)

This invention pertains to the catalytic hydrotreating of an oil-in-liquid phase by passing the oil through a horizontal fixed catalyst bed having a length several times its height.

Catalytic hydrotreating processes involving the treating of hydrocarbons, such as shale oil and petroleum oils, at elevated temperatures and in the presence of hydrogen over a catalyst having a hydrogenating component have been practiced for some time. In some cases, the coil is only mildly treated to remove contaminants, such as nitrogen and sulfur compounds, to reduce unsaturation and/or to improve color or stability. More severe treating may be used to secure aromatics hydrogenation, molecular weight reduction, isomerization, cyclization, and the like. Such hydrotreating processes are known by various names, such as hydrodesulfurization, hydrocracking, hydroisomerization, hydroforming, and hydrocyclization.

In conventional systems, operating with an oil an appreciable portion of which is non-vaporizable under the processing conditions, the feed stock is usually passed downwardly in mixed vapor-liquid phase over the catalyst in one or more reactors. Good contacting of both the vapor phase and the liquid phase with the catalyst is difficult to achieve. Liquid bypassing and consequent inefficient catalyst utilization is quite common. Liquid bypassing is particularly disadvantageous when one is attempting to achieve 100% elimination of a contaminant such as sulfur. When one is attempting to obtain molecular weight reduction or cracking of the oil, it is difficult to keep the liquid oil phase in contact with the catalyst for the optimum time without overexposing and, in certain instances, underexposing the light vaporous products of the cracking. In other words, satisfactory exposure to catalyst of the vapor and liquid components of a mixed phase feed is very nearly impossible to attain with existing processes and equipment.

The present invention is concerned with a process and apparatus for improving feed catalyst contacting in hydrotreating processes operating on oils, a substantial portion of which, if not all, is liquid at the conditions of hydrotreating. In brief compass, the hydrotreating catalyst is maintained, according to this invention, as a horizontally elongated bed having a length over five times its height. The reaction zone containing the elongated bed is provided with a vapor passageway above the length of the bed. Free hydrogen or hydrogen-containing gas is introduced into the lower portion of the bed at a plurality of spaced points along the bottom portion of the bed and in amounts sufficient to maintain a considerable hydrogen partial pressure throughout the bed and to compensate for hydrogen consumed during the hydrotreating reaction. The preheated liquid oil feed is introduced into one or both ends of the elongated bed and flows in liquid phase in a generally horizontal direction through the bed. The treated liquid oil phase is recovered from the opposite end of the bed if feed is introduced at only one end of the vessel or from the mid-portion of the vessel if feed is supplied at both ends of the vessel. While the vessel or bed is indicated to be horizontal, it will be understood that the vessel may be tilted to accommodate the liquid head required to force the oil through the catalyst particles. This may be of the order of about one foot in twenty. If the flow of oil is from each end toward the center, the amount of slope required may be cut to one quarter or one eighth of this and hence may be negligible. The vaporous products produced by the reaction and the excess hydrogen are recovered overhead from the vapor passageway above the bed.

In a preferred embodiment, the liquid oil phase, before being introduced into the hydrotreating reactor, is presaturated with hydrogen. In view of the fact the oil in the liquid phase reacting in the catalyst may only consume the hydrogen which is actually dissolved in the oil, the present process leads to improved hydrogenation because of improved saturation with hydrogen. Some vaporization of the oil may occur in the hydrogen presaturation zone. These vapors and the vapors and hydrogen recovered from the hydrotreating reactor may be passed to a conventoinal fixed bed vapor phase hydrofining zone and processed as desired.

The hydrotreating process of this invention may encompass a wide range of processing conditions, depending upon the results desired. The pressure used is sufficient to maintain an appreciable amount, at least 10–20%, of the oil charge stock in liquid phase. If elimination of contaminants such as nitrogen, sulfur, and color or odor body precursors is desired, the reaction conditions are relatively mild, conversions to material boiling outside of the feed stock boiling range are small, less than 10%, and hydrogen consumption is modest, usually less than 500 s.c.f./b. Severity is determined by balancing the catalyst activity, the reaction temperature, the feed rate or contact time and hydrogen partial pressure. High severity operations can be practiced, such as hydrocracking, wherein as much as 60% of the feed per pass may be converted to lower boiling, high quality products. Recycle to extinction, i.e., recycle of materials boiling in the feed stock boiling range until they are all converted to lower boiling products, may be carried out. Paraffin hydroisomerization, e.g., to improve the quality of a 700–850° F. wax stock might be considered a reaction of intermediate severity. A low severity operation might be the hydroisomerization of low boiling paraffins such as butane, pentane, hexane and the like at temperatures of 100° to 800° F. The hydrotreating process of this invention may also be used for the hydrogenation of a fluid catalytic cracking cycle stock boiling in the range of 400–650° F. to reduce aromatics concentration and to improve the cracking characteristics of the stock.

The following description of a drawing attached to and forming a part of this specification will serve to make this invention clear. Table I summarizes the ranges of pertinent operating conditions applicable to this invention and gives a specific example thereof. The example is drawn with reference to the process illustrated in the drawing.

The feed stock to the process can be selected from a wide range of materials. It may contain considerable amounts of lower boiling constituents which are fairly readily vaporizable. Diluents may be used to improve the viscosity of the liquid phase or to control heat consumption or release during processing. Thus, an aromatic gas oil in the 500–650° F. boiling range can be used as a flux for a 750–900° F. lube oil stock that is being desulfurized. A saturated recycle fraction can be used as a diluent for a highly unsaturated feed stock, such as hydrocracked heavy naphtha, to prevent undue temperature rises. The feed stock generally will boil in the range of 400–1000° F., although it may contain up to 80 wt. percent of residual components boiling above this temperature. The hydrogen used in the process generally has a purity above 60%, with purity above 85% being preferred since lower total pressure can be used as the concentration of hydrogen increases.

Referring to the drawing, the preheated oil feed in line 1 is introduced into hydrogen saturation zone 10 which may contain inert packings such as ceramic rings 11 to improve contacting. The feed is saturated with about all the hydrogen it can hold in the saturator. The hydrogen partial pressure is preferably maintained above 5 atmospheres. Hydrogen absorption increases with increasing temperatures and will vary somewhat between different feed stocks. If the feed contains an appreciable amount of components that are fairly readily vaporizable, zone 10 can serve as a stripper or fractionator and may have plates or packings to improve contacting. The hydrogen is introduced by line 2 and the excess hydrogen containing the vaporized portions of the oil is removed by line 3.

The hydrogen saturated liquid oil phase is passed by line 4 to the hydrotreating reactor 30 of this invention. The reactor comprises a fixed bed 31 of a catalyst having a hydrogenation component. Reactor 30, as illustrated, is a cylindrical vessel with dished ends. The catalyst bed is supported by a solid plate 33. Hydrogen is introduced at a plurality of points along the length of the bed by distributors 34 having supply lines 35 attached to manifold 36. This hydrogen may be preheated or cooled as is necessary to maintain the proper hyrotreating reaction temperature in bed 31. The height of the bed is such that a vapor passageway 37 exists above the bed. This vapor passageway preferably occupies at least about 1% of the volume of vessel 30. The liquid level of the oil in the bed is maintained either by a weir at the exit end of the reactor or by rate of product removed by line 39.

In operation, the liquid oil phase flows horizontally through bed 31, and is removed by line 39. Depending upon the operation conditions, a portion of the oil may be vaporized or converted to lower boiling products which pass upwardly into vapor passageway 37 and are removed therefrom by line 38. During the hydrotreating, the hydrogen concentration in the liquid oil phase is reduced. In order to maintain an adequate reaction rate, sufficient amounts of hydrogen are supplied along the reactor by distributors 34 to keep the oil substantially saturated with hydrogen. This hydrogen is preferably added in excess so that the gas will also serve to agitate the oil. The excess hydrogen is removed overhead along with the vapors through line 38.

The height of liquid oil is preferably such that the oil-liquid phase is within about 15% of the height of the top of bed 31. It may be desirable, in some instances, to maintain the liquid level above the top of bed 31. The nature of the catalyst and the rate of hydrogen addition is such preferably that the liquid oil phase occupies at least 60–90% of the void spaces in the bed below the liquid level.

The liquid phase contacting in the manner proposed by this invention assures good contacting of the hydrogen, the liquid oil phase, and the catalyst, and prevents backmixing of the treated material with the untreated material coming into the bed. This lack of backmixing greatly increases the ease at which essentially 100% elimination or conversion of contaminants can be achieved. The reactor, and liquid oil feed rate, can be so designed and adjusted for an oil residence time as long as desired, without having, however, unduly long retention of the lighter vaporous products from hydrotreating reaction.

The catalyst used in the hydrotreating reactor can be selected from any one of several known catalyst compositions. It will usually contain a hydrogenation component such as cobalt, nickel, chromia, platinum, molybdenum, tungsten in the form of the metal or oxide or sulfide. This hydrogenation component will usually be carried on a base such as activated alumina, charcoal, kieselguhr, or bauxite. The catalyst may be a multifunctional catalyst. It can have an acid cracking component such as aluminum chloride, HCl or HF added to it. The catalyst base may be a silica-alumina cogel as is used in catalytic cracking units. The relative activities of the various components of the catalyst can be balanced along with operating conditions to achieve a wide range of desired reactions.

The vaporous products and hydrogen recovered from hydrotreating reactor 30 can be further treated as desired under optimum conditions for vapor phase treating. The vaporous products can be passed from line 38 to a high pressure separator 40 wherein entrained liquid is removed by line 41 and combined with the liquid product in line 39, with the gases and vapors being taken overhead by line 42. The material in line 42 may be combined with the vapors in line 3 and passed to a conventional fixed bed hydrofining or hydrodesulfurization zone 20, for example operating with a catalyst such as cobalt molybdate or nickel carried on activated alumina or kieselguhr. The hydrofining conditions can be optimized for vapor phase operation such as, for example, to obtain sulfur removal. The hydrofined vaporous product is removed by line 21 and further processed if desired. The material entering hydrofining zone by line 3 can be heated or cooled as is necessary by conventional means. Zone 20 could also be a hydroforming zone.

If further processing of the vaporous product is not desired, it may be substantially totally condensed in separator 40 leaving a relatively pure hydrogen gas stream. This hydrogen gas stream can be recovered by line 43 and recycled to line 2. The hydrogen in this stream could be concentrated by conventional means, if desired, before being recycled.

Since many hydrogenation reactions are exothermic, a stream of partially treated liquid oil may be removed from the reactor, preferably near or at the bottom of the bed, cooled in conventional heat exchange equipment, and returned at a point approximately vertically above the takeoff point. This cooling is obtained without upsetting the essentially "plug-flow" horizontally through the reactor. If desired, the liquid may be removed from the top of the reactor and returned to the bottom. As many cooling circuits as desired may be used along the length of the reactor. Heat may also be added in a similar manner.

Table I gives the general range of reaction conditions and a specific example of this invention. The example is based on the desulfurization of a long residuum, using relatively mild conversion conditions.

Table I

| | Range | Example |
|---|---|---|
| Oil Feed: | | |
|   IBP, °F | >430 | 550. |
|   FBP, °F | <1,100 | 1,100+. |
|   S, wt. percent | | 2.4. |
|   N, wt. percent | | 0.03. |
|   Paraffins, wt. percent | | 57. |
|   Aromatics, wt. percent | | 12. |
|   Naphthenes, wt. percent | | 31. |
|   Source | | Mid-East. |
| Hydrogen Saturation Zone—10: | | |
|   Average Oil Temp., °F | 500 to 800 | 650. |
|   Hydrogen Rate, s.c.f./b | 200 to 9,000 | 1,430. |
|   Pressure, p.s.i | 200 to 3,000 | 800. |
|   Vaporized Oil Removed Overhead, percent | 1 to 50 | 13. |
|   $H_2$ Absorbed by Oil, s.c.f./b. Liquid Phase | 6 to 80 | 20. |
| Vapor Phase Hydrofining Zone—20: | | |
|   $H_2$/Oil Ratio in Vapor, Mole/Mole | 0.5 to 20 | 2.0. |
|   Vapor Inlet Temp., °F | 450 to 750 | 610. |
|   Feed Rate, v./hr./v | 0.5 to 5 | 2. |
|   Pressure, p.s.i | 190 to 3,000 | 790. |
|   Hydrogen Consumption, s.c.f./b | 100 to 1,000 | 400. |
|   Percent S Removal | | 84. |
|   Catalyst | | 12 wt. percent $CoMo_4$ on alumina. |
| Hydrotreating zone—30: | | |
|   Oil Inlet Temperature, °F | 500 to 850 | 750. |
|   Avg. Bed Temperature, °F | 550 to 860 | 760. |
|   Hydrogen Preheat, °F | 100 to 500 | 100. |
|   Total Hydrogen Rate, s.c.f./b | 500 to 9,000 | 2,200. |
|   Avg. Hydrogen Partial Press., p.s.i | 150 to 2,140 | 610. |
|   Total Pressure, p.s.i. | 200 to 3,000 | 800. |
|   Feed Rate, w./hr./w | 0.20 to 5.0 | 0.75. |
|   Liquid Mass Flow Rate, Bls./Hr./Sq. Ft. Bed Cross-Section | 1 to 20 | 8. |
|   Hydrogen Consumption, s.c.f./b | 200 to 3,000 | 1,100. |
|   Conversion, Percent Material out of Feed Boiling Range | 1 to 98 | 22. |
|   Bed Height, ft | 12 | 12. |
|   Bed Length, Percent of Height | 100 to 1,200 | 800. |
|   Bed Width, Percent of Height | 50 to 500 | 100. |
|   Voids in Bed, Percent | 30 to 40 | 35. |
|   Percent of Voids Occupied by Liquid Below Liquid Level | 40 to 100 | 62. |
|   Liquid Level, Percent of Height | 50 to 100 | 90. |
|   Diameter of Catalyst Vessel, ft | | 12. |
|   Percent of Vessel Vol. above Bed Level | 5 to 30 | 10. |
|   Catalyst | | Cobalt Molybdate on Alumina. |
|   Wt. Percent S Removal | | 82. |
|   Selectivity on Fresh Feed, Vol. $C_4$+Liquid Prod | 80 to 120 | 115. |
|   Product IBP-FBP, °F | | 462 to 1,100+. |

In the example of the table, the vaporous components of the feed and those components which remain liquid are each separately treated under optimum conditions for achieving sulfur reduction. The liquid phase, generally speaking, is maintained in contact with the catalyst in hydrotreating zone 30 for a time about 5 to 10 times longer than that which could have been achieved in a mixed liquid-vapor phase reactor. The separate handling of the vapor and liquid portions of the feed stock results in several advantages over a system where the vapor and liquid along with the hydrogen is passed over the same catalyst in a trickle type of operation. These advantages are more efficient use of catalyst, more efficient use of hydrogen and feed stock, less costly plant and lower operating costs.

Having described this invention, what is sought to be protected by Letters Patent is set forth in the following claims.

What is claimed is:

1. A method of hydrotreating a hydrocarbon oil at least a substantial portion of which is in liquid phase, which comprises providing a horizontally elongated fixed bed of hydrogenating catalyst having a length over five times its height and a width one-half to two times its height and being arranged in an enclosing reaction zone to provide a passageway for gaseous material arranged above the top and for the length of said fixed catalyst bed, introducing preheated liquid oil feed into one end of said fixed catalyst bed and flowing the oil feed in a horizontal direction through said fixed catalyst bed whereby a relatively long catalyst contacting time is provided for the oil feed, maintaining the liquid level of the liquid phase oil feed greater than about 50% of the fixed catalyst bed height, introducing free hydrogen into the lower portions of said fixed catalyst bed at a plurality of regions spaced along the length of said catalyst bed for upward and vertical passage therethrough and in an amount sufficient to substantially saturate the oil feed with hydrogen and in excess to agitate the oil feed as it passes horizontally through said fixed catalyst bed whereby gaseous material passes upwardly into said passageway and has a short catalyst contacting time, collecting gaseous material leaving said catalyst bed in said passageway above said catalyst bed, withdrawing collected gaseous material from the top of said reaction zone via said passageway, and withdrawing treated liquid oil from the other end of said catalyst bed.

2. The method of claim 1 wherein said preheated liquid oil feed is first contacted in liquid phase in a hydrogen saturation zone with free hydrogen to the extent that said feed contains at least 40 s.c.f. of dissolved hydrogen per barrel before being passed to said reaction zone.

3. The method of claim 2 wherein hydrogen and vaporized hydrocarbons are recovered overhead from said hydrogen saturation zone, co-mingled with the gaseous material withdrawn from said reaction zone, and further processed in a vapor phase catalytic hydrotreating zone.

4. The method of claim 1 wherein said method is carried out at a temperature in the range of 550 to 860° F., a total pressure in the range of 200 to 3000 p.s.i., a feed rate in the range of 0.2 to 5.0 lbs./hr./lb. of catalyst, a mass flow rate of 1 to 20 lbs./hr./sg. ft. of hydrotreating zone cross-section, a total hydrogen addition rate of 200 to 9000 s.c.f./b., a hydrogen consumption in the range of 100 to 3000 s.c.f./b., and a feed boiling point in the range of 430 to 1100° F. ASTM.

5. A method of hydrotreating a hydrocarbon oil at least a substantial portion of which is in liquid phase, which comprises providing a horizontally elongated fixed bed of hydrogenating catalyst having a length over five times its height and being arranged in an enclosing reaction zone to provide a passageway for receiving gases and vapors arranged above the top and for the length of said fixed catalyst bed, introducing preheated liquid oil feed into one end of said fixed catalyst bed and flowing the oil feed in a horizontal direction through said fixed catalyst bed, maintaining the liquid level of the liquid phase oil feed below the top of said fixed catalyst bed, introducing free hydrogen into the lower portions of said fixed catalyst bed at a plurality of regions spaced along the length of said catalyst bed for upward and vertical passage therethrough and in an amount sufficient to substantially saturate the oil feed with hydrogen and in exces to agitate the oil feed as it passes horizontally through said fixed catalyst bed, collecting gases and vapors leaving said catalyst bed in said passageway above said bed, withdrawing collected gases and vapors from the top of said reaction zone, and withdrawing treated liquid oil from the other end of said catalyst bed.

References Cited in the file of this patent

UNITED STATES PATENTS

| | | |
|---|---|---|
| 2,648,623 | Porter et al. | Aug. 11, 1953 |
| 2,671,754 | De Ross et al. | Mar. 9, 1954 |
| 2,706,167 | Harper et al. | Apr. 12, 1955 |
| 2,946,742 | Rampino et al. | July 26, 1960 |
| 2,968,614 | Brooks et al. | Jan. 17, 1961 |